(12) United States Patent
Suryanarayana et al.

(10) Patent No.: US 11,194,588 B2
(45) Date of Patent: Dec. 7, 2021

(54) INFORMATION HANDLING SYSTEMS AND METHOD TO PROVIDE SECURE SHARED MEMORY ACCESS AT OS RUNTIME

(71) Applicant: DELL PRODUCTS L.P., Round Rock, TX (US)

(72) Inventors: Shekar B. Suryanarayana, Bangalore (IN); Chandrasekhar Puthillanthe, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 655 days.

(21) Appl. No.: 16/030,456

(22) Filed: Jul. 9, 2018

(65) Prior Publication Data

US 2020/0012501 A1 Jan. 9, 2020

(51) Int. Cl.
*G06F 9/44* (2018.01)
*G06F 9/4401* (2018.01)
(Continued)

(52) U.S. Cl.
CPC ........ *G06F 9/4411* (2013.01); *G06F 9/44505* (2013.01); *G06F 21/44* (2013.01);
(Continued)

(58) Field of Classification Search
CPC .. G06F 9/4411; G06F 9/44505; G06F 9/4401; G06F 9/4406; G06F 21/44;
(Continued)

(56) References Cited

U.S. PATENT DOCUMENTS

| 9,043,527 B2 * | 5/2015 | Bhatia | G06F 13/385 |
| | | | 710/313 |
| 10,242,176 B1 * | 3/2019 | Sathyanarayana | G06F 13/42 |

(Continued)

FOREIGN PATENT DOCUMENTS

KR 20140117932 A * 10/2014 ........... G06F 9/4401

OTHER PUBLICATIONS

Advanced Configuration and Power Interface (ACPI) Specification Copyright 2017 Unified EFI Forum, Inc. (Version 6.2) pp. 1071; (Sep. 2017).*

(Continued)

*Primary Examiner* — Samson B Lemma
*Assistant Examiner* — Ali H. Cheema
(74) *Attorney, Agent, or Firm* — Egan, Enders & Huston LLP.

(57) ABSTRACT

The present disclosure provides an information handling system (IHS) and related methods that provide secure shared memory access (SMA) to shared memory locations within a Peripheral Component Interconnect (PCI) device of an IHS. The IHS and methods disclosed herein provide secure SMA to one or more operating system (OS) applications that are granted access to the shared memory. According to one embodiment, the disclosed method provides secure SMA to one or more OS applications by receiving a secure runtime request from at least one OS application to access shared memory locations within a PCI device, authenticating the secure runtime request received from the OS application, creating a secure session for communicating with the OS application, and providing the OS application secure runtime access to the shared memory locations within the PCI device.

19 Claims, 7 Drawing Sheets

(51) Int. Cl.
*G06F 21/44* (2013.01)
*G06F 21/52* (2013.01)
*G06F 21/78* (2013.01)
*G06F 9/445* (2018.01)

(52) U.S. Cl.
CPC .............. *G06F 21/52* (2013.01); *G06F 21/78* (2013.01); *G06F 9/4401* (2013.01); *G06F 9/4406* (2013.01)

(58) Field of Classification Search
CPC ......... G06F 21/52; G06F 21/74; G06F 21/78; G06F 9/44; G06F 9/45558
USPC ................... 726/27, 23; 713/300, 2; 380/44
See application file for complete search history.

(56) References Cited

U.S. PATENT DOCUMENTS

| | | | | |
|---|---|---|---|---|
| 2004/0243534 | A1* | 12/2004 | Culter | G06F 9/4411 |
| 2005/0246487 | A1* | 11/2005 | Ergan | G06F 12/0866 |
| | | | | 711/113 |
| 2006/0020834 | A1* | 1/2006 | Qureshi | G06F 1/26 |
| | | | | 713/300 |
| 2008/0313312 | A1* | 12/2008 | Flynn | G06F 3/0613 |
| | | | | 709/221 |
| 2013/0283381 | A1* | 10/2013 | Thadikaran | H04L 63/08 |
| | | | | 726/23 |
| 2015/0331694 | A1* | 11/2015 | Balakrishnan | G06F 9/4401 |
| | | | | 713/2 |
| 2016/0055007 | A1* | 2/2016 | Toriyama | G06F 9/44505 |
| | | | | 713/2 |
| 2016/0124751 | A1* | 5/2016 | Li | G06F 21/74 |
| | | | | 380/44 |
| 2016/0306961 | A1* | 10/2016 | Suryanarayana | G06F 21/44 |
| 2016/0364243 | A1* | 12/2016 | Puthillathe | G06F 9/4406 |
| 2017/0024353 | A1* | 1/2017 | Bhatia | G06F 9/44505 |
| 2017/0147370 | A1* | 5/2017 | Williamson | G06F 9/45558 |
| 2017/0270301 | A1* | 9/2017 | Vidyadhara | G06F 21/575 |
| 2017/0337064 | A1* | 11/2017 | Vidyadhara | G06F 9/4401 |
| 2018/0095740 | A1* | 4/2018 | Kotary | G06F 8/60 |
| 2018/0314458 | A1* | 11/2018 | Balakrishnan | G06F 11/1004 |
| 2018/0324052 | A1* | 11/2018 | Nachimuthu | H04Q 9/00 |

OTHER PUBLICATIONS

Research into PCI Express Device's Configuration Space on PC Platform by Cheng Hai-Quan, Xu Shu-yan and Hu Jun pp. 4; IEEE (Year: 2010).*
Shared Scratch-Pad Memory Space Management by Ozcan Ozturk and Mahmut Kandemir and Ibrahim Kolcu pp. 6; IEEE (Year: 2006).*
PCI Special Interest Group, "PCI BIOS Specification", Aug. 26, 1994, 28 pgs.
PCI Special Interest Group, "PCI Express Base Specification", Rev 4, Version 0.3, Feb. 19, 2014, 1053 pgs.
Wiki, "XSDT", Extended System Descriptor Table (XSDT_-the 64 bit version of the ACPI RSDT, Printed from Internet Jul. 2018, 5 pgs.
Intel, "Enabling Intelligent Platform Management Interface (IPMI) Through Standard Builidng Blocks", 2002, 11 pgs.

* cited by examiner

INFORMATION HANDLING SYSTEMS AND METHOD TO PROVIDE SECURE SHARED MEMORY ACCESS AT OS RUNTIME

FIELD

This invention relates generally to information handling systems (IHSs), and more particularly, to methods for providing secure shared memory access (SMA) to operating system (OS) applications at OS runtime.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

The following description of various embodiments of information handling systems and related methods is not to be construed in any way as limiting the subject matter of the appended claims.

The present disclosure is directed to information handling systems (IHSs) and related methods that provide secure shared memory access (SMA) to operating system (OS) applications at OS runtime.

According to one embodiment, an information handling system (IHS) in accordance with the present disclosure may generally include a computer readable storage medium configured for storing an operating system (OS) and at least one OS application, and a baseboard management controller (BMC) including non-volatile memory, which is configured to store BMC firmware, and a processor configured to execute the BMC firmware. During OS runtime, the BMC processor may be configured to execute the BMC firmware to: receive a secure runtime request from the at least one OS application to access shared memory locations within the non-volatile memory; authenticate the secure runtime request received from the at least one OS application; create a secure session for communicating with the at least one OS application after the secure runtime request is authenticated; and provide the at least one OS application secure runtime access to the shared memory locations within the non-volatile memory.

The IHS may further include a computer readable memory and a host processing device. The computer readable memory may be configured to store boot firmware and Advanced Configuration and Power Interface (ACPI) firmware. The boot firmware may generally include boot services and runtime services. Examples of boot firmware include, but are not limited to, a Basic Input/Output System (BIOS) and/or a Unified Extensible Firmware Interface (UEFI). The ACPI firmware may generally include ACPI runtime services and ACPI tables.

During a pre-boot phase of the boot firmware, the host processing device may be configured to execute one or more boot services of the boot firmware to configure Peripheral Component Interconnect (PCI) configuration registers contained within the BMC, and to store configuration space information within an ACPI table of the ACPI firmware. In addition, the host processing device may be configured to execute one or more additional boot services of the boot firmware to disable the PCI configuration registers contained within the BMC during the pre-boot phase, thereby disabling access to the shared memory locations within the non-volatile memory of the BMC.

During OS runtime, ACPI runtime services may be executed by the host processing device to provide one or more OS applications access to the shared memory locations within the non-volatile memory of the BMC. For example, the host processing device may execute a first ACPI runtime service to receive a secure runtime request from at least one OS application and communicate the secure runtime request to the BMC. In addition, the host processing device may execute a second ACPI runtime service to provide an authenticated handshake to the BMC. Upon receiving the secure runtime authenticated handshake, the BMC firmware may be executed by the BMC processor to authenticate the secure runtime request. Once the request is authenticated, a third ACPI runtime service may be executed by the host processing device to provide the at least one OS application access to the shared memory locations. For example, the third ACPI runtime service may be executed to access the configuration space information stored within the ACPI table and use the configuration space information to locate a device path access service, which points to runtime services of the boot firmware. The runtime services may include methods to open a shared memory access (SMA) channel to the shared memory locations and begin communication over the SMA channel.

In some embodiments, an SMA service table may include entries for mapping the methods included within the runtime services of the boot firmware to a BMC access service, and the BMC access service may include methods to directly call functions that are executable to access the shared memory locations within the non-volatile memory.

In some embodiments, the first ACPI runtime service, the second ACPI runtime service, the third ACPI runtime service, the device path access service, the SMA service table and the BMC access service may be constructed and added to a boot table of the boot firmware during the pre-boot phase of the boot firmware. During OS runtime, the ACPI runtime services, device path access service, SMA service table and BMC access service may be used to provide a secure communication path between the BMC and one or more OS applications.

According to another embodiment, a method is disclosed herein for providing an OS application with secure shared memory access (SMA) to shared memory locations within a Peripheral Component Interconnect (PCI) device. As used herein, the term "PCI device" includes both PCI and PCI- Express (PCIe) devices. The method disclosed herein may generally include receiving a secure runtime request from an OS application to access shared memory locations within a PCI device. Although not limited to such, the PCI device may be a baseboard management controller (BMC) of an information handling device, in one embodiment. After receiving the secure runtime request, the method may include authenticating the secure runtime request, creating a secure session for communicating with the OS application, and providing the OS application secure runtime access to the shared memory locations within the PCI device.

In some embodiments, the secure runtime request may be received from the OS application via a first ACPI runtime service. In some embodiments, the secure runtime request may be authenticated upon receiving a secure runtime authenticated handshake from a second ACPI runtime service.

Access to the shared memory locations is disabled prior to receiving the secure runtime request from the OS application. In some embodiments, the method may perform one or more steps, prior to receiving the secure runtime request, to disable access to the shared memory locations. For example, the method may configure PCI configuration registers of the PCI device and store configuration space information within an ACPI table. After the configuration space information is stored, the method may disable the PCI configuration registers of the PCI device to disable access to the shared memory locations prior to the step of receiving.

In some embodiments, the method may provide the OS application with secure runtime access to the shared memory locations within the PCI device via a third ACPI runtime service. For example, the third ACPI runtime service may be used to access the configuration space information stored within the ACPI table, and the configuration space information may be used to locate the shared memory locations within the non-volatile memory of the PCI device. In addition the third ACPI runtime service may be used to call boot firmware runtime services, which include methods to open a shared memory access (SMA) channel to the shared memory locations and begin communication over the SMA channel. The methods within the boot firmware runtime services may then be mapped to an access service, which includes methods to directly call functions that are executable to access the shared memory locations.

BRIEF DESCRIPTION OF THE DRAWINGS

Other advantages of the present disclosure will become apparent upon reading the following detailed description and upon reference to the accompanying drawings in which.

Figure 1:
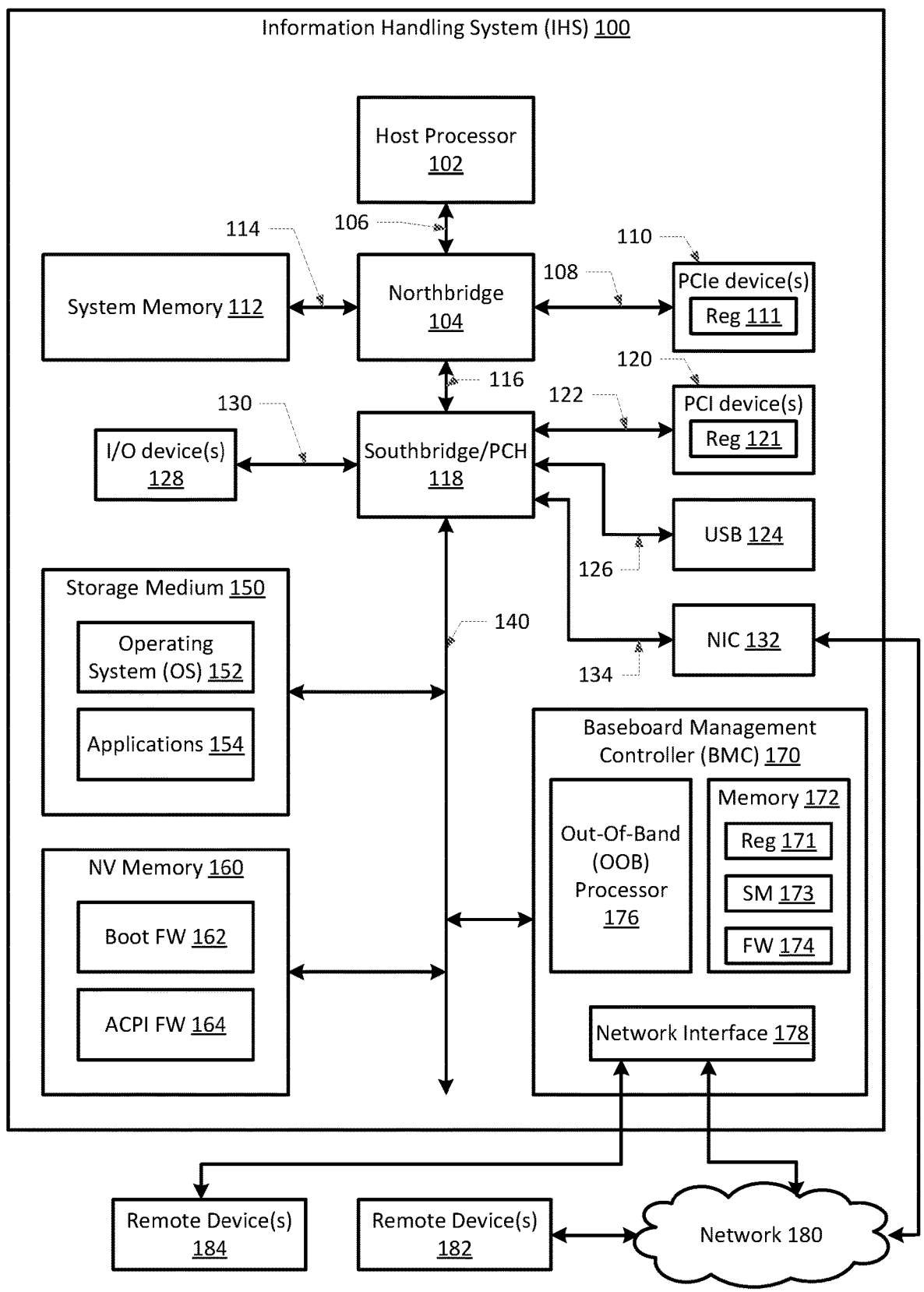
FIG. 1 is a block diagram illustrating various components of an information handling system (IHS), according to one embodiment of the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIG. 1 is a block diagram of an information handling system (IHS) 100 as it may be configured according to one embodiment of the present disclosure. In this regard, it will be understood that the IHS configuration shown in FIG. 1 is exemplary only, and that the disclosed methods may be implemented on any type of information handling system. It will be further understood that while certain components of the information handling system are shown in FIG. 1 for illustrating embodiments of the present disclosure, the information handling system disclosed herein is not restricted to including only those components shown in FIG. 1 and described below.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Turning to FIG. 1, information handling system (IHS) 100 may generally include one or more host processing devices 102. Examples of host processing device(s) 102 include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). Host processing device(s) 102 may include any processor or processing device capable of executing program instructions. According to one embodiment, host processing device(s) 102 may include at least one central processing unit (CPU) having one or more processing cores. The CPU may include any type of processing device, such as an Intel Pentium series processor, an Advanced Micro Devices (AMD) processor or another processing device. In some embodiments, host processing device(s) 102 may include other types of processing devices including, but not limited to, a graphics processor unit (GPU), a graphics-derivative processor (such as a physics/gaming processor), a digital signal processor (DSP), etc.

Northbridge controller or chipset 104 is directly connected to host processing device(s) 102 via a front-side bus 106, and is configured to coordinate communication between host processing device(s) 102 and one or more IHS components. In the embodiment of FIG. 1, for example, northbridge controller 104 is illustrated as being coupled to one or more Peripheral Component Interconnect Express (PCIe) device(s) 110 (e.g., PCIe video cards, hardware RAID controllers, PCIe-SSDs, network cards, GPUs, etc.) via PCIe bus(es) 108, and is coupled to system memory 114 via memory bus 116. Although illustrated as a separate component in FIG. 1, northbridge controller 104 may be integrated into host processing device 102, for example, when host processing device 102 is implemented as a silicon-on-chip (SoC) processor.

System memory 112 is configured to store program instructions and/or data, which is accessible and executable by host processing device(s) 102. System memory 112 may be implemented using any suitable memory technology, including but not limited to, random access memory (RAM), static RAM (SRAM), synchronous dynamic RAM (SDRAM), nonvolatile/Flash-type memory, or any other type of memory.

In some embodiments, northbridge controller 104 may be coupled to a southbridge controller or chipset 118 via an internal bus 116. In other embodiments, southbridge controller 118 may be replaced by a platform controller hub (PCH) and connected directly to the host processing device 102 via a direct media interface (DMI). Southbridge controller/PCH 118 handles I/O operations for the IHS, and thus, includes a variety of communication interfaces and ports, such as Peripheral Component Interconnect (PCI), Universal Serial Bus (USB), audio, serial, parallel, Ethernet, etc. In the example embodiment shown in FIG. 1, southbridge controller/PCH 118 is shown coupled to PCI device(s) 120 via PCI bus 122, to USB interface(s) 124 via USB bus 126, to one or more I/O devices 128 via PCI bus 130 and to network interface controller (NIC) 132 via PCI bus 134.

Examples of PCI device(s) 120 that may be included within IHS 100 include, but are not limited to, network cards, sound cards, video cards, modems, disk controllers, and extra ports, such as USB and/or serial ports. Examples of USB interfaces(s) 124 that may be included within IHS 100 include wired and wireless interfaces that communicate via one or more USB communication standards, such as USB 1.0, USB 2.0, USB 3.0, and USB 3.1, as well as any future revisions thereof. Examples of I/O devices 128 include, but are not limited to, keyboards, keypads, touch screens, scanning devices, voice or optical recognition devices, or any other devices suitable for entering or retrieving data. Multiple I/O devices 128 may be present within or coupled to IHS 100. In some embodiments, I/O device(s) 128 may be separate from IHS 100 and may interact with IHS 100 through a wired or wireless connection.

NIC 132 enables IHS 100 to communicate with one or more remote device(s) 182, systems and/or services via an external network 180 using one or more communication protocols. Network 180 may be a local area network (LAN), wide area network (WAN), personal area network (PAN), or the like, and the connection to and/or between IHS 100 and network 180 may be wired, wireless or a combination thereof. For purposes of this discussion, network 180 is indicated as a single collective component for simplicity. However, it is appreciated that network 180 may comprise one or more direct connections to other devices, as well as a more complex set of interconnections as can exist within a wide area network, such as the Internet. Network interface device 132 may communicate data and signals to/from IHS 100 using any known communication protocol.

As shown in FIG. 1, southbridge controller/PCH 118 also provides communication and connection to at least one computer readable storage medium 150, at least one computer readable memory 160 and a Baseboard Management Controller (BMC) 170 via system interconnect 140. The system interconnect 140 depicted in FIG. 1 may represent one or more buses, interfaces, hubs and/or controllers used to transfer information between the system components. In some embodiments, system interconnect 140 may include a low pin count (LPC) bus, a serial peripheral interface (SPI) bus, a system management bus (SMBus), etc. Other components not specifically shown in FIG. 1 may also be included within the information handling system.

Computer readable storage medium 150 may be configured to store software and/or data and may be any type of persistent, non-transitory computer readable storage medium, such as one or more hard disk drives (HDDs) or solid-state drives (SSDs). In the illustrated embodiment, computer readable storage medium 150 is configured to store at least one operating system (OS) 152 for the IHS, in addition to one or more user applications 154 and (optionally) user data. OS 152 and application(s) 154 may contain program instructions, which may be executed by host processing device(s) 102 to perform various tasks and functions for the information handling system and/or for the user.

Computer readable memory 160 may be configured to store software and/or firmware modules, and may include any type of non-volatile memory including, but not limited to, read-only memory (ROM), flash memory, and non-volatile random access memory (NVRAM). The software and/or firmware modules stored within computer readable memory 160 may generally contain program instructions (or computer program code), which may be executed by host processing device(s) 102 to instruct components of IHS 100 to perform various tasks and functions for the information handling system. In the embodiment shown in FIG. 1, computer readable memory 160 stores boot firmware (FW) 162 and Advanced Configuration and Power Interface (ACPI) firmware 164.

Boot firmware 162 may include software and/or firmware modules for specifying hardware configuration settings, system time and boot sequence, etc. Boot firmware 162 include a Basic Input/Output System (BIOS) and/or a Unified Extensible Firmware Interface (UEFI). When IHS 100 is powered on or rebooted, program instructions within boot firmware 162 may be executed by host processing device(s) 102 to configure hardware components of the IHS, perform a Power-On Self-Test (POST) to ensure the hardware configuration is valid and working properly, discover and initialize devices (including PCI and PCIe devices) and launch a bootloader to boot OS 152. Once launched, the bootloader within boot firmware 162 retrieves OS 152 from computer readable storage medium 150 and loads it into system memory 112. Boot firmware 162 has control of the system platform during a pre-boot phase of the boot firmware, i.e., the duration of time between a system restart/reboot and the loading of OS 152. Once the OS is loaded and running, platform control shifts to the operating system (i.e., during OS runtime).

Figure 3:
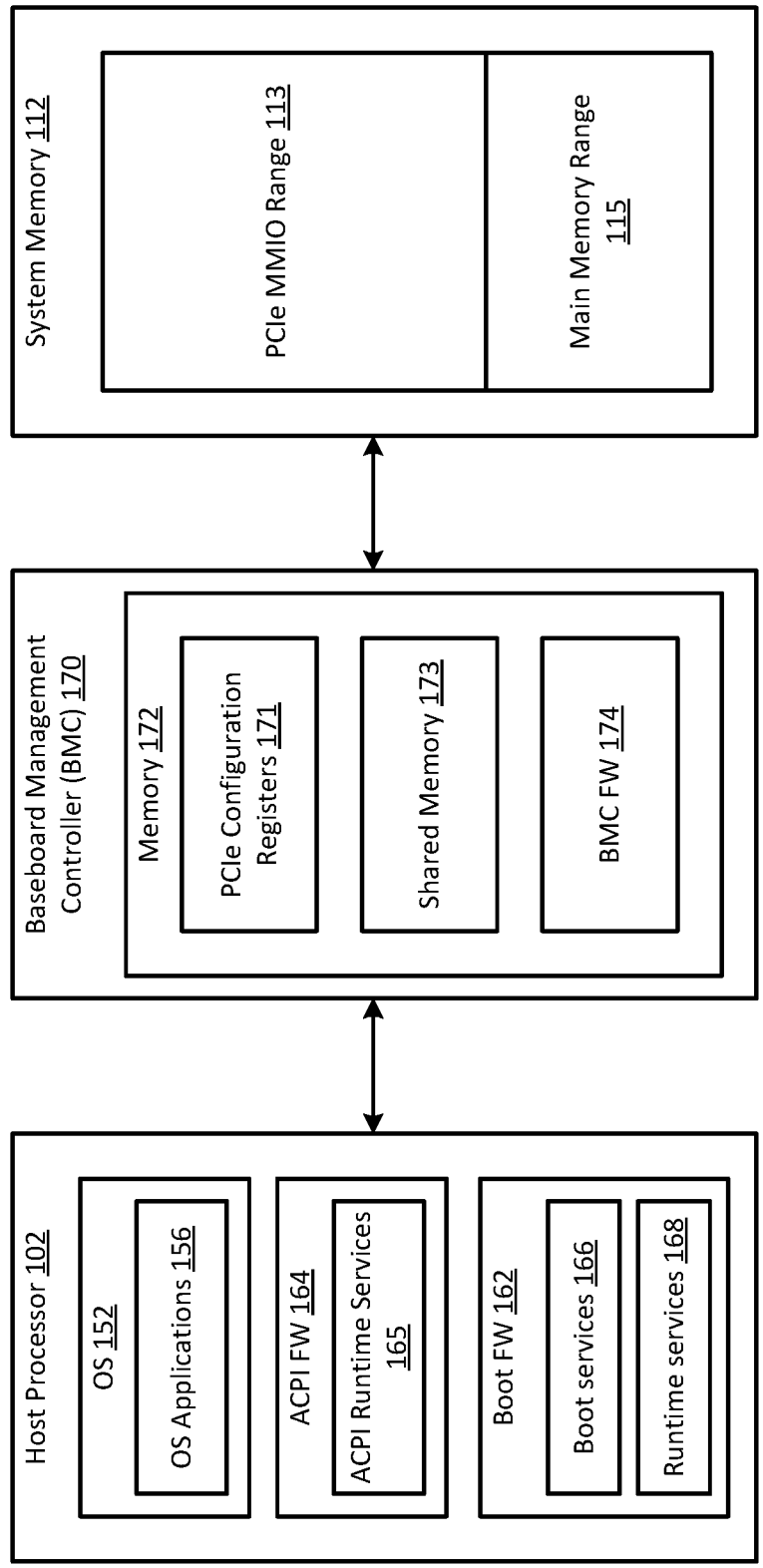
FIG. 3 is a block diagram illustrating various software and/or firmware modules that may be executed by a host processor and baseboard management controller (BMC) of the IHS shown in FIG. 1 to provide secure shared memory access (SMA) during OS runtime.

As shown in FIG. 3, boot firmware 162 includes boot services 166 and runtime services 168. Boot services 166 are available for execution only when the boot firmware 162 owns the platform during the pre-boot phase of the boot firmware before the OS is loaded and running. Examples of boot services 166 typically provided within boot firmware 162 include, but are not limited to, text and graphical consoles, and bus, block and file services. Runtime services 168, on the other hand, are available for execution while the OS is running (i.e., during OS runtime). Examples of runtime services 168 typically provided within boot firmware 162 include, but are not limited to, date/time configuration settings and access to non-volatile memory. As described in more detail below, boot firmware 162 may include additional boot services 166 and/or additional runtime services 168, which may be executable to perform various steps of the methods disclosed herein.

The Advanced Configuration and Power Interface (ACPI) is an open standard that operating systems can use to discover and configure computer hardware components and to perform power management, thermal management and status monitoring. ACPI serves as an interface layer between boot firmware 162 and OS 152. The latest version of the ACPI specification may be found on the Unified Extensible Firmware Interface (UEFI) Forum website (http://uefi.org/specifications) and is incorporated herein in its entirety.

In addition to boot firmware 162, computer readable memory 160 may be configured to store ACPI firmware 164, which includes ACPI tables, ACPI BIOS and ACPI registers and provides OS-independent interfaces between the platform hardware and OS-specific technologies, interfaces and code. During the pre-boot phase of boot firmware 162, ACPI firmware 164 communicates available hardware components and their functions to OS 152 using methods provided by boot firmware 162 (UEFI or BIOS). More specifically, ACPI firmware 164 constructs all ACPI tables and populates the interfaces and handlers to be used during OS runtime. To construct the ACPI tables, ACPI firmware 164 uses boot services 166 of boot firmware 162 to capture all hardware units and associated power components. The APCI tables are used during OS runtime to provide ACPI runtime services 165 to OS 152. The ACPI runtime services 165 typically include advanced power management functions for the OS, and the ACPI tables include hooks to all handlers where the runtime services are called. As set forth in more detail below, ACPI firmware 164 may include additional runtime services, which may be executable to perform various steps of the methods disclosed herein. For example, and as described in more detail below, ACPI runtime services 165 may be called to establish a channel between BMC 170 and one or more OS applications 156 to establish secure, shared memory access (SMA) to shared memory regions within the BMC.

Baseboard Management Controller (BMC) 170 is a service processor that monitors the physical state of IHS 100 and communicates with a system administrator through an independent network connection. Although not limited to such, BMC 170 may include an integrated Dell Remote Access Controller (iDRAC) from Dell®, in one embodiment. An iDRAC is embedded within many Dell servers and provides functionality that helps information technology (IT) administrators deploy, update, monitor, and maintain servers with no need for any additional software to be installed. As shown in FIG. 1, BMC/iDRAC 170 includes an integrated non-volatile memory 172 for storing BMC firmware 174, an out-of-band (OOB) processor 176 for executing BMC firmware 174, a network interface 178 for providing remote access to/from the IHS, and access to system interconnect (or system bus) 140. In one embodiment, BMC 170 is a PCIe device, which is connected via a PCIe bus to system interconnect 140. Network interface 178 allows remote users (such as IT administrators) to manage, administer, use, and/or access various resources of IHS 100 from a remote location, e.g., via remote devices 182/184 and/or network 180.

In addition to BMC firmware 174, the non-volatile memory 172 within BMC 170 may include a block of memory or a range of memory locations (referred to herein as "shared memory," SM) 173 that may be shared by one or more IHS components, devices or applications. In conventional information handling systems, access to the shared memory 173 within BMC 170 is typically limited to a pre-boot phase of boot firmware 162. As set forth in more detail below, BMC firmware 174 may include additional software and/or firmware modules, which may be executable to perform various steps of the methods disclosed herein. As described in more detail below, for example, BMC firmware 174 may include additional software and/or firmware modules, which when executed by out-of-band processor 176 may be configured to receive a secure runtime request from an OS application to access shared memory 173, authenticate the secure runtime request, create a secure session for communicating with the OS application and provide secure runtime access to the shared memory via ACPI runtime services.

Figure 2:
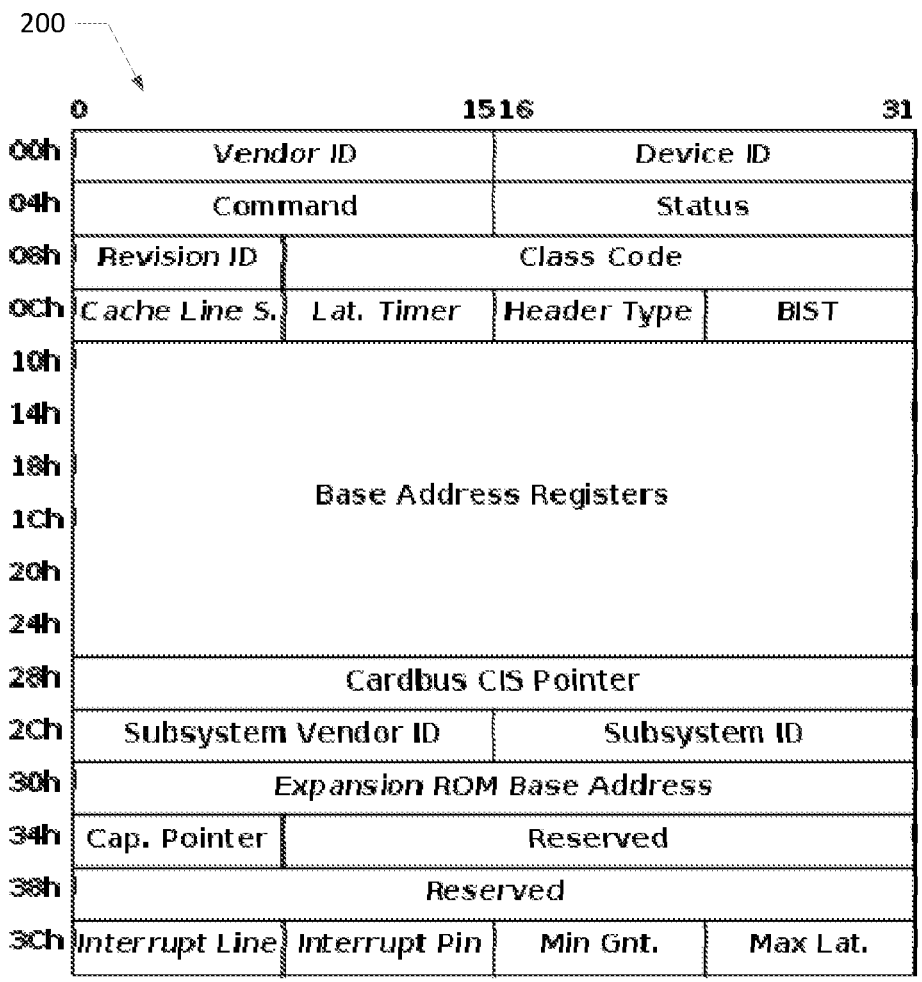
FIG. 2 is a diagram of Peripheral Component Interconnect (PCI) configuration space registers that may be included within a PCI device.

As shown in FIG. 1, PCI device(s) 110, PCIe device(s) 120 and BMC 170 (a PCIe device) include a set of PCI configuration registers 111/121/171 (also referred to as a PCI configuration space), which are typically mapped to memory locations within system memory 112 during the pre-boot phase of boot firmware 162. FIG. 2 is diagram illustrating the standard registers of a PCI Type 0 configuration space 200. According to the PCI specification, all PCI devices must support the Vendor ID, Device ID, Command and Status, Revision ID, Class Code and Header Type fields. Implementation of the other registers is optional, depending upon the devices functionality. Additional details of the PCI configuration space registers 200 may be obtained from the PCI Specification, which can be found on the PCI-SIG website (https://pcisig.com/specifications) and is incorporated herein in its entirety.

According to the PCI specification, the Device ID and Vendor ID registers identify the particular PCI device and the manufacturer of the device, respectively, and are commonly called the PCI ID. The 16-bit vendor ID is allocated by the PCI Special Interest Group (PCI-SIG). The 16-bit device ID is then assigned by the vendor. The Subsystem Vendor ID and the Subsystem Device ID further identify the PCI/e device. For example, if the Vendor ID is that of the chip manufacturer, the Subsystem Vendor ID is that of the card manufacturer. The Subsystem Device ID is assigned by the subsystem vendor, but is assigned from the same number space as the Device ID. The Command register provides control over a device's ability to generate and respond to PCI cycles and contains a bitmask of features that can be individually enabled and disabled. The Status register is used to record status information for PCI bus related events. The Revision ID specifies a revision identifier for a particular device. The Class Code specifies the type of function the device performs. In addition to the fields mentioned above, the Cache Line Size specifies the system cache line size in 32-bit units, the Latency Timer specifies the latency timer in units of PCI bus clocks and the BIST represents the status and allows control of a device's built-in self-test (BIST). The Header Type identifies the layout of the rest of the header and also specifies whether the PCI device has a single function or multiple functions. A Header Type of 0x00 identifies the PCI device as a general device.

If the PCI device is a general device, the PCI configuration space registers 200 may further include CardBus CIS Pointer, Interrupt Line, Interrupt Pin, Min Grant, Maximum Latency and Capabilities Pointer fields. The CardBus CIS Pointer points to the Card Information Structure and is used by devices that share silicon between CardBus and PCI. The Interrupt Pin specifies which interrupt pin the PCI device uses, while the Interrupt Line specifies which input of the system interrupt controllers the PCI device's interrupt pin is connected to. The Maximum Latency specifies how often the PCI device needs access to the PCI bus, and the Minimum Grant specifies the burst period length that the PCI device needs. Finally, the Capabilities Pointer points to a linked list of new capabilities implemented by the device.

The Base Address Registers (BARs) and the expansion ROM base address register (XROMBAR) are readable and writeable registers, which are used to map the PCI device memory to the system memory map stored, e.g., within system memory 112. More specifically, the BARs and XROMBAR map the PCI device memory to memory locations within the PCI Memory Map I/O (MMIO) range of the system memory map. As shown in FIG. 3, the PCI MMIO range 113 resides above the Main Memory Range 115 in the system address map.

During the pre-boot phase, the PCI device(s) 110, PCIe device(s) 120 and BMC 170 within IHS 100 are detected and enumerated by reading the Vendor ID and Device ID register for each combination of bus number and device number (i.e., the PCI device's sequential number on a given bus). If the read is successful for a given PCI/e device, the boot firmware 162 or OS 152 maps the PCI device memory to the PCI MMIO range of the system memory map and writes the memory mapped and I/O port addresses into the BARs of the PCI configuration space register 200. These addresses remain valid as long as the IHS remains powered on.

In conventional information handling systems, access to the shared memory 173 within BMC 170 is currently limited to the pre-boot phase only. Before OS 152 is loaded and running, boot firmware 162 typically disables shared memory access (SMA), rendering shared memory (SM) 173 inaccessible to OS 152 and other virtual machines. However, there are instances during which it may be desirable to provide shared memory access during OS runtime. For example, it may be desirable to provide shared memory access between OS application(s) and BMC 170 during OS runtime to: provide read/write access of sensitive information (such as firmware updates) from/to BMC 170, overcome the lack of IPMI access in virtual machines, address security concerns arising from the BMC/iDRAC's exposure to USB mass storage and network devices, etc.

To meet these needs, embodiments of the present disclosure provide a secured shared memory access (SMA) channel between OS 152 and BMC 170 during OS runtime. As described in more detail below with respect to FIGS. 3-6, the SMA channel is enabled during the pre-boot phase via boot services 166 of boot firmware 162. At the end of POST, BMC firmware 174 hides the SMA channel from OS 152, thereby preventing OS applications from accessing shared memory 173 during OS runtime and further preventing OS drivers from programming the PCI configuration space registers 200. In addition, new runtime services (referred to herein as ACPI runtime services) are provided herein to enable secure, authenticated communication between OS 152 and BMC 170 over the SMA channel during OS runtime. In the present disclosure, read/write data access to shared memory 173 is provided without the use of additional OS or PCI drivers or the need for applications to require BMC credentials for data access.

FIG. 3 is a block diagram illustrating various software and/or firmware modules that may be executed by host processor 102 and BMC 170 to provide secure shared memory access (SMA) to shared memory 173 locations within BMC 170. As described briefly above, host processor 102 may be generally configured to execute boot services 166 during the pre-boot phase of boot firmware 162 (e.g., BIOS or UEFI) and runtime services 168 during OS runtime. As described in more detail below with respect to FIGS. 3-5, boot services 166 may be executed by host processor 102 to map the PCI/e configuration space 200 of a given PCI/e device (e.g., BMC 170) to memory locations within the PCI Memory Map I/O (MMIO) range 113 of the system memory map stored within system memory 112. As shown in FIG. 3, the PCI MMIO range 113 resides above the Main Memory Range 115 in the system address map.

In the present disclosure, additional boot services 166 may be executed by host processor 102 to enable the SMA channel between OS 152 and BMC 170 and to assign the bus/device/function (BDF) numbers and base address registers (BAR's) to the PCIe configuration registers 171 of BMC 170. In one embodiment, boot services 166 may send an intelligent platform management interface (IPMI) command to BMC 170 to enable PCI configuration registers 171, and therefore, enable the SMA channel between the OS and the BMC. At the end of POST, BMC firmware 174 hides the PCI/e configuration space 171 from OS 152, so that OS PCI enumerations cannot detect the SMA channel provided between OS 152 and BMC 170 and OS drivers cannot directly access the PCI/e configuration space 171 of BMC 170. In one embodiment, boot services 166 may send a IPMI command to BMC 170 to disable PCIe configuration registers 171 and hide the SMA channel established between the OS and the BMC.

During OS runtime, ACPI runtime services 165 within ACPI FW 164 may be executed by host processor 102 to provide a secured SMA channel between one or more OS applications 156 and BMC 170. For example, and as described in more detail below, a first ACPI runtime service 165 executed by host processor 102 may receive a secure runtime request from an OS application 156 to access the SMA channel established between the OS and BMC. Thereafter, a second ACPI runtime service 165 may be executed by host processor 102 to provide a secure runtime authenticated handshake to BMC 170. Upon receiving the handshake, BMC 170 may authenticate the secure runtime request and create a Virtual Authenticated Secure Session (VASS) 175 for communicating with the OS application 156. Thereafter, a third ACPI runtime service 165 may be executed by host processor 102 to provide secure runtime access (read/write) to the PCI/e configuration space 171 and shared memory 173 within BMC 170.

Figure 4:
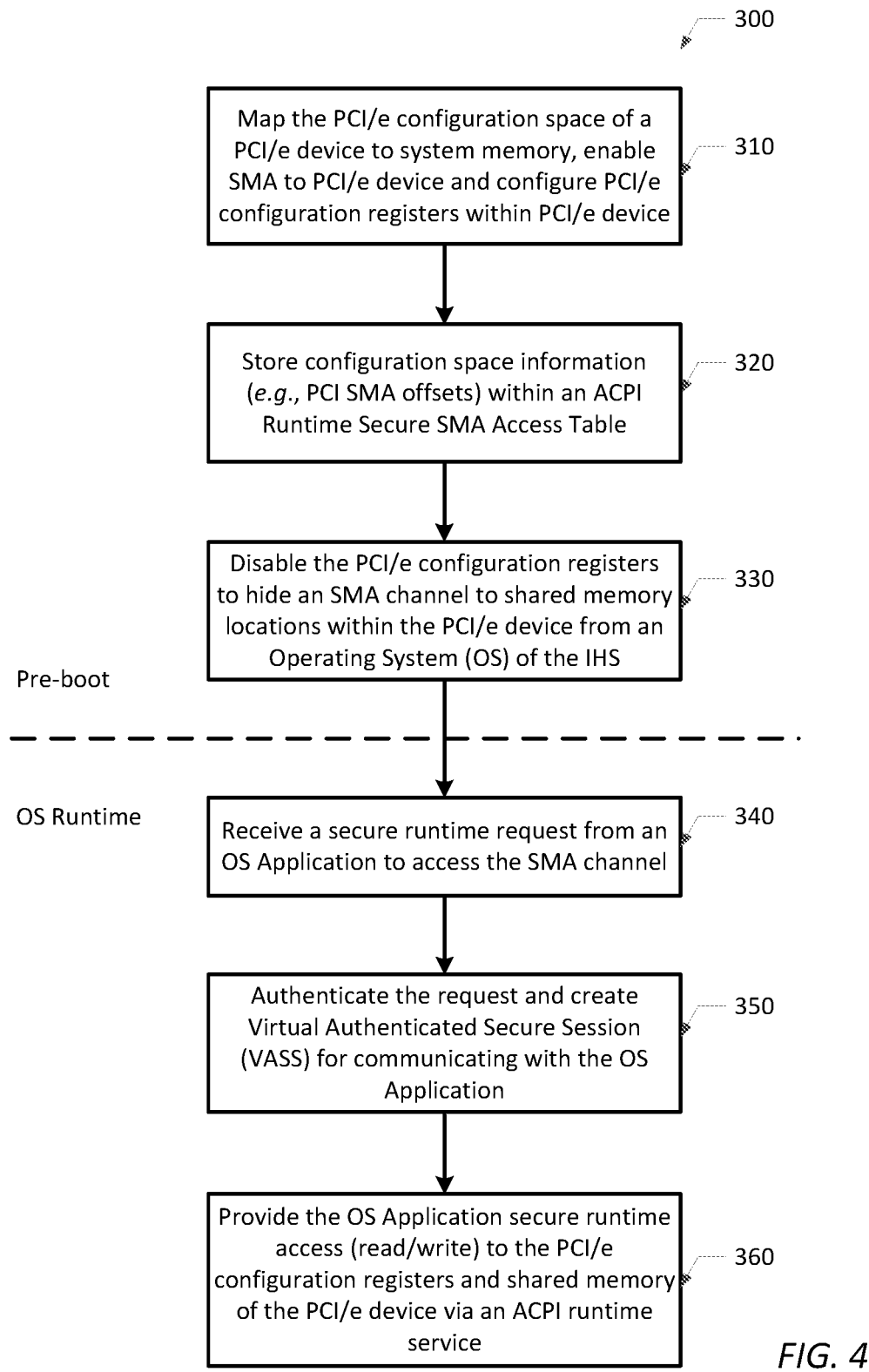
FIG. 4 is a flowchart diagram illustrating a method to provide secure shared memory access (SMA) during OS runtime, according to one embodiment of the present disclosure.
Figure 5:
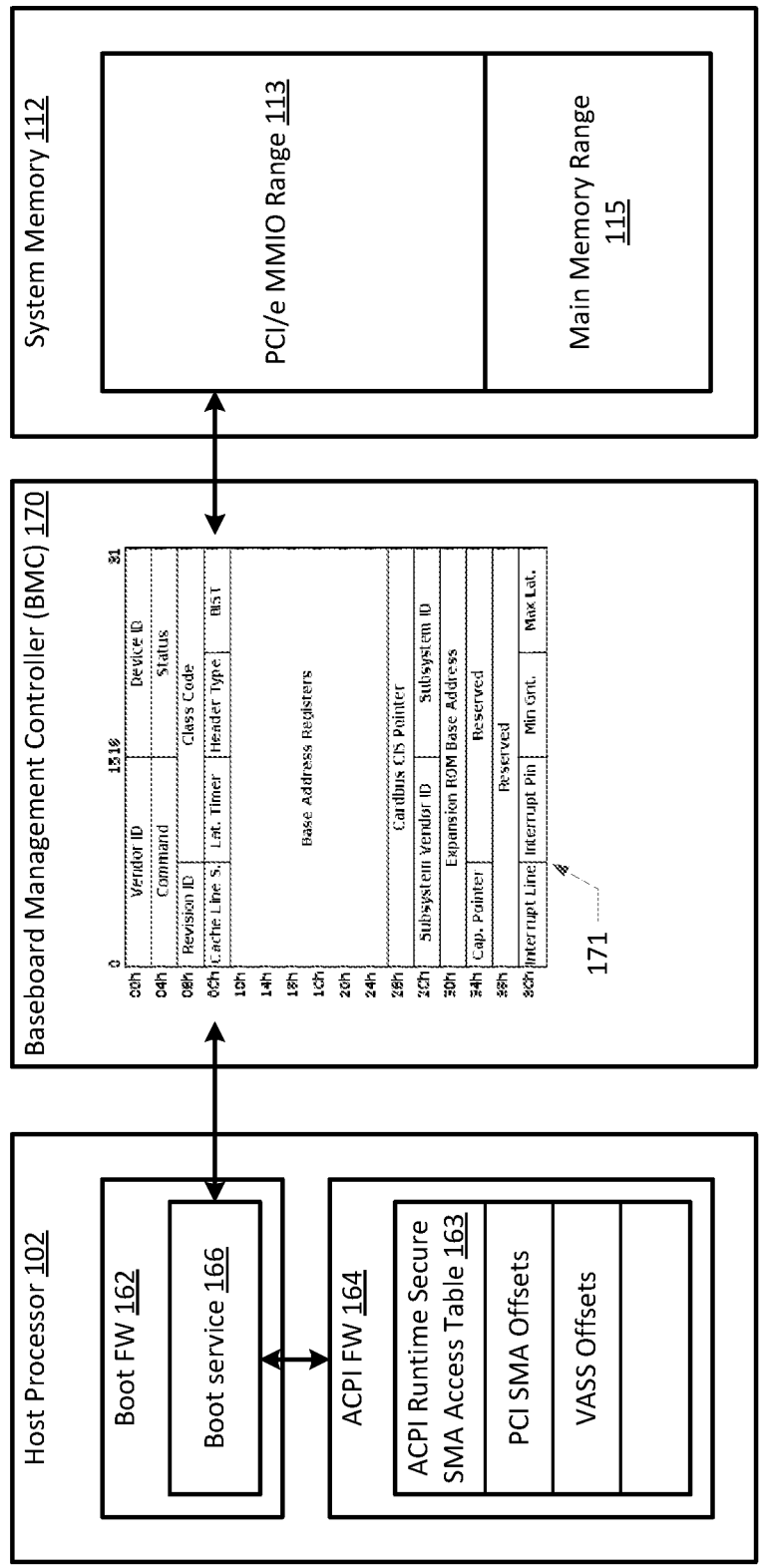
FIG. 5 is a functional block diagram of the IHS components shown in FIG. 3 implementing the method steps shown in FIG. 4 that are performed during a pre-boot phase (i.e., before the operating system finishes booting)
Figure 6:
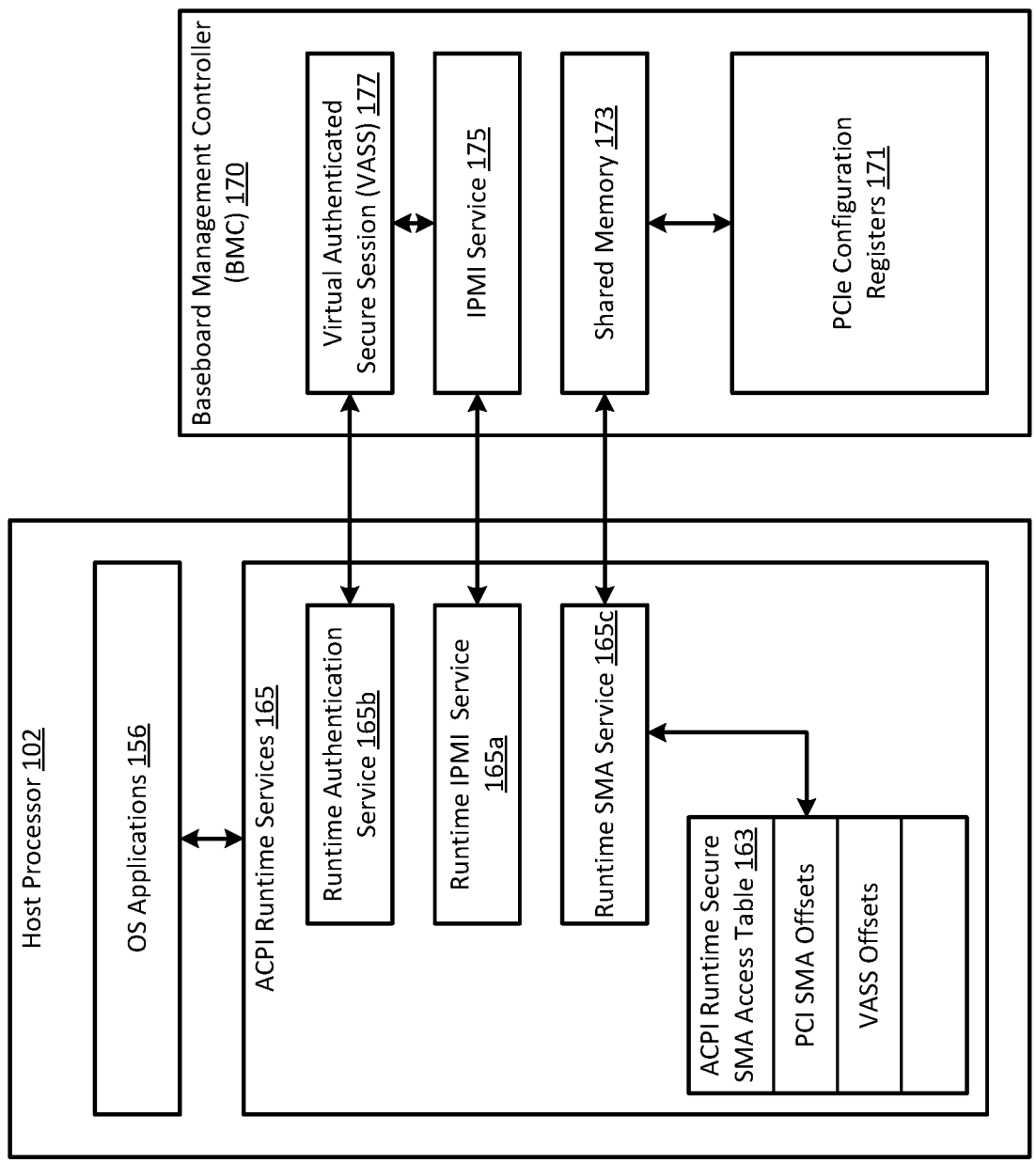
FIG. 6 is a functional block diagram of the IHS components shown in FIG. 3 implementing the method steps shown in FIG. 4 that are performed during OS runtime (i.e., after the operating system finishes booting)

FIG. 4 is a flowchart diagram illustrating one embodiment of a method 300 that may be used to provide secure shared memory access (SMA) to memory locations within a PCI/e device, such as for example BMC 170. According to one embodiment, method 300 may provide secure access to shared memory 173 locations within the non-volatile memory 172 of BMC 170. FIG. 5 is a functional block diagram of the IHS components shown in FIG. 3 implementing the method steps shown in FIG. 4 that are performed during the pre-boot phase of the boot firmware (i.e., before the operating system finishes booting). FIG. 6 is a functional block diagram of the IHS components shown in FIG. 3 implementing the method steps shown in FIG. 4 that are performed during OS runtime (i.e., after the operating system finishes booting).

Referring to FIGS. 4 and 5, method 300 may begin during the pre-boot phase (in step 310) when boot services 166 are used to map the PCI/e configuration space of a PCI/e device to system memory and configure the PCI/e configuration registers within the PCI/e device. In one embodiment, boot services 166 may be executed by host processor 102 to map the PCI/e configuration space 171 of BMC 170 to memory locations within the PCI Memory Map I/O (MMIO) range 113 of the system memory map stored within system memory 112. In addition, boot services 166 may be executed by host processor 102 (in step 310) to enable shared memory access (SMA) to memory locations within the PCI/e device and configure the PCIe configuration registers of the PCI/e device, for example, by assigning the bus/device/function (BDF) numbers and base address registers (BAR's) to the PCIe configuration registers of the PCI/e device. In one embodiment, boot services 166 may send an IPMI command to BMC 170 to enable SMA and configure the PCI configuration registers 171 within the BMC.

In step 320, boot services 166 are executed to store configuration space information (e.g., PCI SMA Offsets and VASS Offsets) within a new ACPI table (referred to herein as an ACPI runtime secure SMA access table) 163 provided within ACPI FW 164. By storing the configuration space information in an ACPI protected memory location (e.g., within ACPI table 163), the configuration space information is hidden from the OS and accessible by custom ACPI functions only.

Figure 7:
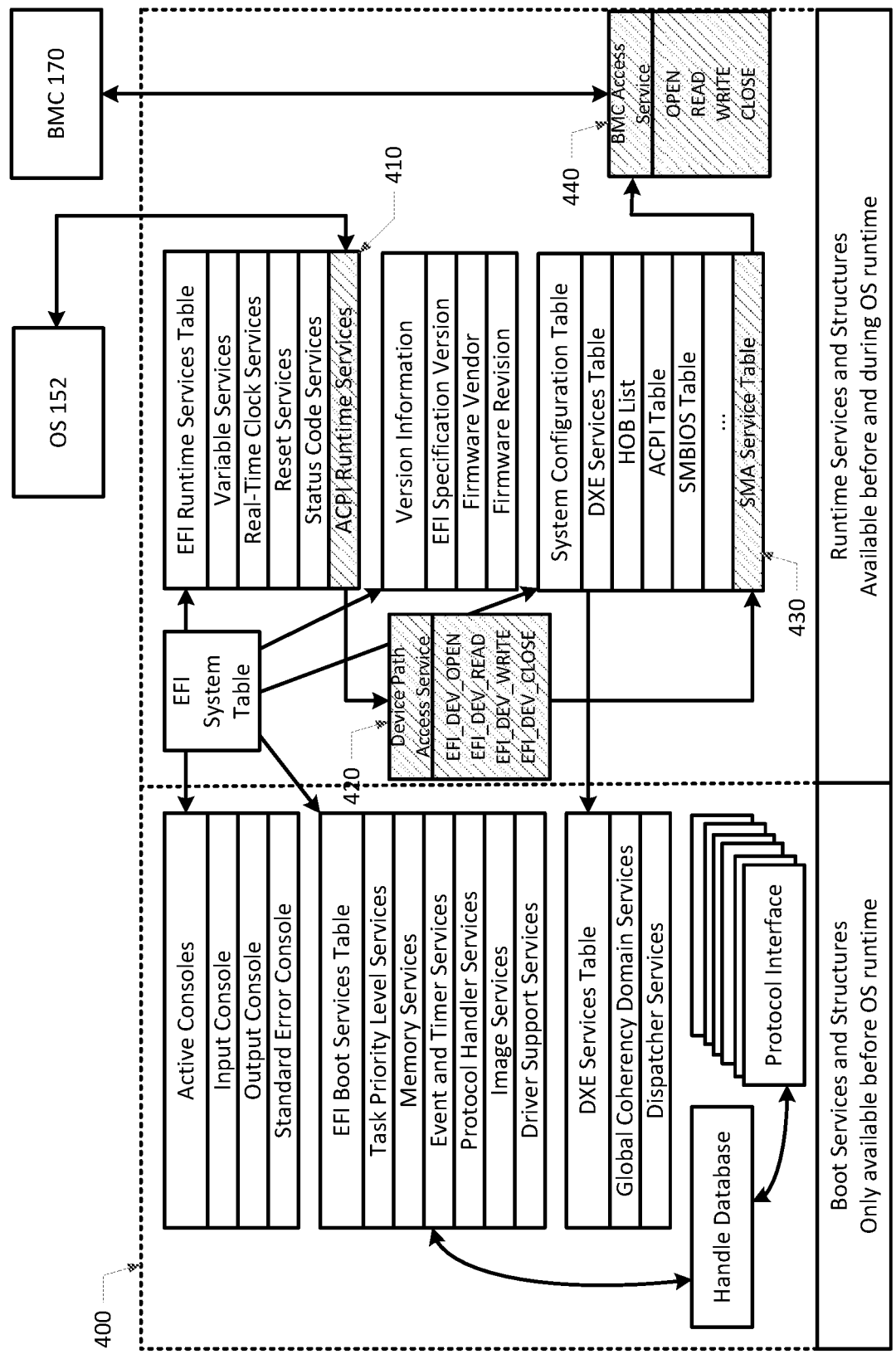
FIG. 7 is a block diagram illustrating various services and tables that may be added to the UEFI System Table to provide secure shared memory access (SMA) during OS runtime, according to one embodiment of the present disclosure.

In one embodiment, the configuration space information stored within ACPI table 163 may include a set of handles pointing to runtime services (e.g., EFI_DEV_OPEN, EFI_DEV_READ, EFI_DEV_WRITE, and EFI_DEV_CLOSE, as shown in FIG. 7) that are constructed during pre-boot and mapped to runtime memory for OS 152 to access from ACPI runtime services 165 during OS runtime. These services are used to establish a communication channel with the shared memory. In some embodiments, ACPI table 163 may include handles pointing to other services, such as validate, session open, session expire, etc., depending on implementation.

In step 330, PCI/e configuration registers of the PCI/e device are disabled to hide the SMA channel from the OS 152. In one embodiment, boot services 166 may send another IPMI command to BMC 170 to disable PCIe configuration registers 171 and hide the SMA channel established between the OS and the BMC. Disabling the PCI/e configuration registers of the PCI/e device (e.g., BMC 170) prevents the PCI/e device from being detected and enumerated during brute force and recursive PCI device scans. In this manner, step 330 may prevent PCI enumerations from probing or detecting the SMA channel established between OS 152 and BMC 170.

Referring to FIGS. 4 and 6, method 300 may continue during OS runtime if an OS application 156 requests shared memory access to shared memory locations within a PCI/e device (e.g., access to shared memory 173 within BMC 170). If shared memory access (SMA) is requested by an OS application 156 during OS runtime, a first ACPI runtime service 165*a* (depicted as a Runtime IPMI Service in FIG. 6) executed by host processor 102 may receive a secure runtime request from an OS application 156 to access the SMA channel established between the OS and BMC 170 in step 340. OS application 156 may send management/control commands by invoking the first ACPI runtime service 165*a*. In one example embodiment, ACPI runtime service 165*a* may send IPMI commands to IPMI service 175 within BMC 170 using SMA, as shown in FIG. 6, but is not strictly limited to such.

As shown in FIG. 6, a second ACPI runtime service 165*b* (depicted as a Runtime Authentication Service) may be executed by host processor 102 to provide a secure runtime authenticated handshake to BMC 170. Upon receiving the handshake, BMC 170 may authenticate the request and create a Virtual Authenticated Secure Session (VASS) 177 in step 350 for communicating with the OS application 156.

In some embodiments, BMC 170 may create application specific data (e.g., IPMI commands, application session ID, etc.) and write the application specific data to a specified memory region within the shared memory 173. ACPI functions (e.g., read from SMA) may be used to read the application specific data from the specified memory region. In some embodiments, application session IDs may be enforced by BMC 170 and ACPI functions for all sub-functions that require authentication. For security reasons, application sessions may expire after a certain amount of time.

After the secure session is created by BMC 170, a third ACPI runtime service 165*c* (depicted as a Runtime SMA Service in FIG. 6) may be executed by host processor 102 to provide secure runtime access (read/write) to the shared memory 173 and PCI/e configuration registers 171 of BMC 170 in step 360. The third ACPI runtime service 165*c* is already aware of the PCIe configuration space for SMA and will use PCIe as a conduit to transmit management commands to shared memory 173. According to one embodiment, the third ACPI runtime service 165*c* may provide secure runtime access in step 360 by accessing the ACPI table 163 (depicted as ACPI Runtime Secure SMA Access Table in FIG. 6) within ACPI FW 164, and using ACPI runtime functions (e.g., read from SMA and write from SMA) to read from/write to shared memory 173 and PCI/e configuration registers 171 of BMC 170 in step 360. In particular, the third ACPI runtime service 165*c* may use the PCI SMA Offsets stored within ACPI table 163 to locate shared memory 173 and call boot firmware runtime services or methods (e.g., EFI_DEV_OPEN, EFI_DEV_READ, EFI_DEV_WRITE, and EFI_DEV_CLOSE, as shown in FIG. 7) to access and communicate with the shared memory.

In some embodiments, the ACPI runtime functions (e.g., read from SMA and write from SMA) used to provide secure runtime access to shared memory 173 may require sub-functions so that the BMC and OS applications can evolve independently of one another. Examples of such sub-functions include, but are not limited to, firmware updates over the SMA channel, copy loss from OS to BMC, etc. Along with the sub-function code(s), OS applications may send a data payload (e.g., firmware updates) restricted/chunked by SMA size. When there is sensitive data to be transmitted, a sub-function within the BMC FW 174 can enforce authentication mechanisms, such as using encrypted hashes based on private certificates, authentication tokens, etc.

Any OS application 156 can use the SMA functionality provided in FIGS. 4 and 6 at OS runtime by calling the disclosed ACPI runtime services 165. When these services are called, a secure session is created to make the PCI configuration space available to the OS application, and ACPI protected runtime read/write methods are used to access the shared memory.

The method shown in FIG. 4 to provide secure shared memory access (SMA) at OS runtime is a computer implemented method performed, at least in part, by execution of program instructions contained within boot firmware 162, ACPI firmware 164 and/or BMC FW 174 of IHS 100. Unlike conventional information handling systems, the computer implemented methods disclosed herein improve the way in which IHS 100 functions, at the very least, by providing secure shared memory access (SMA) at OS runtime without exposing the SMA channel to OS drivers. This provides secure access to shared memory locations within the BMC, ensuring that only proprietary and secure applications will have access to the BMC. OS applications not granted access to the shared memory will not be able to directly access the shared memory contents. Since SMA is provided through a PCIe function, no additional drivers are needed for data access. Furthermore, BMC credentials are not required for data access. A skilled artisan having benefit of this disclosure may recognize other ways in which the computer implemented methods described herein may be used to improve the functioning of an information handling system, such as IHS 100.

FIG. 7 is a block diagram illustrating various services and tables that are added to the UEFI System Table 400 to provide secure shared memory access (SMA) between OS 152 and BMC 170 during OS runtime, according to one embodiment of the present disclosure. The UEFI System Table 400 shown in FIG. 7 is constructed at boot time using boot services, and later transitioned in the OS space as a runtime service. The left side of FIG. 7 shows the boot services and handles that are available only during the pre-boot phase before the OS is loaded and running. The right side of FIG. 7 shows the runtime services and handles that are available before and during OS runtime. Services and tables added to the UEFI System Table 400 are hatched in FIG. 7 to delineate the added services and tables from those typically included in the UEFI System Table. Description of services and tables typically included in the UEFI System Table is provided in the UEFI Specification, the current version of which is found on the UEFI Forum website (http://uefi.org/specifications) and incorporated herein in its entirety.

As shown in FIG. 7, the present disclosure adds secure ACPI Runtime Services 410 (depicted as ACPI Runtime Services 165 in FIGS. 3 and 6) to the EFI Runtime Services Table and an SMA Service Table 430 to the System Configuration Table of UEFI System Table 400. In addition, the present disclosure adds a Device Path Access Service 420 and a BMC Access Service 440 as runtime services of the UEFI System Table 400. To gain access to shared memory, an OS application may call ACPI Runtime Services 410 to locate Device Path Access Service 420. The Device Path Access Service 420 points to boot firmware runtime services/methods EFI_DEV_OPEN, EFI_DEV_READ, EFI_DEV_WRITE, and EFI_DEV_CLOSE, which may be used to open the SMA channel for OS applications granted access to the shared memory and start communication over the SMA channel. The SMA Service Table 430 includes entries for mapping the services/methods in Device Path Access Service 420 to BMC access service 440, which may be used to communicate with BMC 170. BMC Access Service 440 includes methods used to directly call various functions (e.g., open, read, write, close, etc.) used to access BMC 170, as well as read from/write to shared memory 173 locations within the BMC.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed information handling systems and methods may be utilized in various combinations and/or independently. Thus, the present disclosure is not limited to only those combinations shown herein, but rather may include other combinations.

What is claimed is:

1. An information handling system (IHS), comprising:
  a non-transitory computer readable storage medium storing an operating system (OS) and at least one OS application;
  a baseboard management controller (BMC) comprising non-volatile memory configured to store BMC firmware, and a processor configured to execute the BMC Firmware during OS runtime to:

receive a secure runtime request from the at least one OS application to access shared memory locations within the non-volatile memory, wherein access to the shared memory locations is disabled prior to the received secure runtime request;

authenticate the secure runtime request received from the at least one OS application, wherein the received secure runtime request is authenticated upon receiving a secure runtime authenticated handshake;

create a secure session for communicating with the at least one OS application after the secure runtime request is authenticated; and provide the at least one OS application secure runtime access to the shared memory locations within the non-volatile memory.

2. The information handling system as recited in claim 1, further comprising a non-transitory computer readable memory storing boot firmware and Advanced Configuration and Power Interface (ACPI) firmware, wherein the boot firmware includes boot services and runtime services, and wherein the ACPI firmware includes ACPI runtime services and ACPI tables.

3. The information handling system as recited in claim 2, further comprising a host processing device coupled to the non-transitory computer readable storage medium and to the non-transitory computer readable memory, wherein during a pre-boot phase of the boot firmware, the host processing device executes one or more boot services of the boot firmware to configure Peripheral Component Interconnect (PCI) configuration registers contained within the BMC and store configuration space information within an ACPI table of the ACPI firmware.

4. The information handling system as recited in claim 3, wherein during the pre-boot phase of the boot firmware, the host processing device executes one or more additional boot services to disable the PCI configuration registers contained within the BMC to disable access to the shared memory locations.

5. The information handling system as recited in claim 3, wherein during OS runtime, a first ACPI runtime service is executed by the host processing device to receive the secure runtime request from the at least one OS application and communicate the secure runtime request to the BMC.

6. The information handling system as recited in claim 3, wherein during OS runtime, a second ACPI runtime service is executed by the host processing device to provide the secure runtime authenticated handshake to the BMC, and wherein the BMC firmware is executed by the processor to authenticate the secure runtime request upon receiving the secure runtime authenticated handshake.

7. The information handling system as recited in claim 3, wherein during OS runtime, a third ACPI runtime service is executed by the host processing device to access the configuration space information stored within the ACPI table and use the configuration space information to locate a device path access service, which points to runtime services of the boot firmware.

8. The information handling system as recited in claim 7, wherein during OS runtime, the third ACPI runtime service is further executed by the host processing device to call the runtime services of the boot firmware, wherein the runtime services include methods to open a shared memory access (SMA) channel to the shared memory locations and begin communication over the SMA channel.

9. The information handling system as recited in claim 8, further comprising an SMA service table that includes entries for mapping the methods included within the runtime services of the boot firmware to a BMC access service, and wherein the BMC access service includes methods to directly call functions that are executable to access the shared memory locations within the non-volatile memory.

10. The information handling system as recited in claim 9, wherein the first ACPI runtime service, the second ACPI runtime service, the third ACPI runtime service, the device path access service, the SMA service table and the BMC access service are constructed and stored within a boot table of the boot firmware during the pre-boot phase of the boot firmware.

11. A method to provide an operating system (OS) application, during OS runtime, with secure shared memory access (SMA) to shared memory locations within a Peripheral Component Interconnect (PCI) device, the method comprising, during the OS runtime:

receiving a secure runtime request from the OS application to access shared memory locations within a PCI device, wherein access to the shared memory locations is disabled prior to the step of receiving;

authenticating the secure runtime request received from the OS application, wherein the received secure runtime request is authenticated upon receiving a secure runtime authenticated handshake;

creating a secure session for communicating with the OS application after the secure runtime request is authenticated; and providing the OS application secure runtime access to the shared memory locations within the PCI device.

12. The method as recited in claim 11, wherein the step of receiving comprising receiving the secure runtime request from the OS application via a first Advanced Configuration and Power Interface (ACPI) runtime service.

13. The method as recited in claim 11, wherein the step of authenticating comprises authenticating the secure runtime request upon receiving the secure runtime authenticated handshake from a second Advanced Configuration and Power Interface (ACPI) runtime service.

14. The method as recited in claim 11, wherein prior to the step of receiving, the method comprises configuring PCI configuration registers of the PCI device and storing configuration space information within an Advanced Configuration and Power Interface (ACPI) table.

15. The method as recited in claim 14, wherein prior to the step of receiving, the method comprises disabling the PCI configuration registers of the PCI device to disable access to the shared memory locations.

16. The method as recited in claim 14, wherein the step of providing comprises accessing the configuration space information stored within the ACPI table and using the configuration space information to locate the shared memory locations within the non-volatile memory.

17. The method as recited in claim 14, wherein the step of providing comprises executing a third ACPI runtime service to call boot firmware runtime services.

18. The method as recited in claim 17, further comprising executing methods within the boot firmware runtime services to open an SMA channel to the shared memory locations and begin communication over the SMA channel.

19. The method as recited in claim 18, further comprising mapping the methods within the boot firmware runtime services to an access service comprising methods to directly call functions, which are executable to access the shared memory locations.

* * * * *